(12) United States Patent
Kaku et al.

(10) Patent No.: US 6,224,007 B1
(45) Date of Patent: *May 1, 2001

(54) TAPE CASSETTE

(75) Inventors: Nobuyuki Kaku, Naka-gun; Seiji Ono, Yokohama; Yoshimi Maehara, Ootsu; Mikihisa Inoue, Otokuni-gun, all of (JP)

(73) Assignees: Hitachi Maxell, Ltd., Osaka; Hitachi, Ltd., Tokyo, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/315,124

(22) Filed: May 20, 1999

Related U.S. Application Data

(60) Continuation of application No. 08/897,445, filed on Jul. 18, 1997, now Pat. No. 5,927,632, which is a division of application No. 08/607,524, filed on Feb. 27, 1996, now Pat. No. 5,702,062, which is a continuation of application No. 08/359,849, filed on Dec. 20, 1994, now abandoned, which is a continuation of application No. 08/106,999, filed on Aug. 17, 1993, now abandoned.

(51) Int. Cl.[7] .................................................. G11B 23/04
(52) U.S. Cl. ..................... 242/338.4; 242/336; 242/347; 360/94
(58) Field of Search ................................ 242/338.4, 347, 242/348, 336; 360/132, 85, 94; 352/78 R

(56) References Cited

U.S. PATENT DOCUMENTS

| | | | |
|---|---|---|---|
| 3,980,255 | 9/1976 | Serizawa | 242/347.1 |
| 4,268,877 | 5/1981 | Moris et al. | 242/326 |
| 4,567,536 | 1/1986 | Tsuchiya | 360/94 X |
| 5,099,378 | 3/1992 | Turgeon | 242/336 |
| 5,702,062 | 12/1997 | Kaku et al. | 242/338.4 |

FOREIGN PATENT DOCUMENTS

| | | |
|---|---|---|
| 60-125983 | 7/1985 | (JP) . |
| 61-28296 | 8/1986 | (JP) . |

*Primary Examiner*—John Q. Nguyen

(57) ABSTRACT

A first tape cassette adapted to be interchangeably used with a second tape cassette of a different thick case thickness is provided. A first tape cassette includes a first case having a first total thickness. The first case having a bottom face which is formed with an indentation and a first depression formed within the indentation. The indentation is used for positioning the cassette in a plane parallel to its bottom face. The second tape cassette includes a second case having a second total thickness that is smaller than the first total thickness of the first case. The second case has a bottom face which is formed with a second reference depression opened towards the bottom face. The second reference depression is for positioning the second tape cassette in a plane parallel to its bottom face.

15 Claims, 6 Drawing Sheets

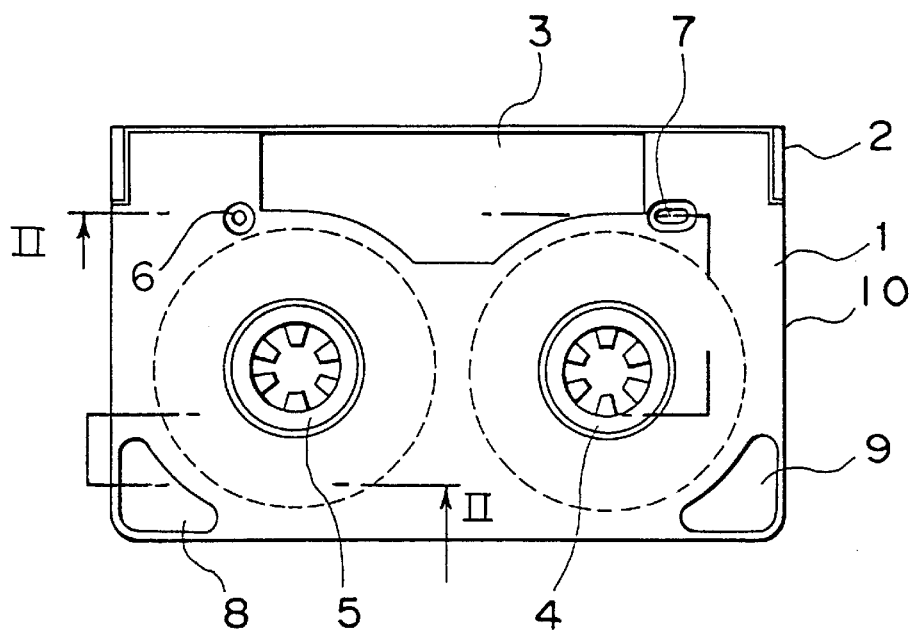
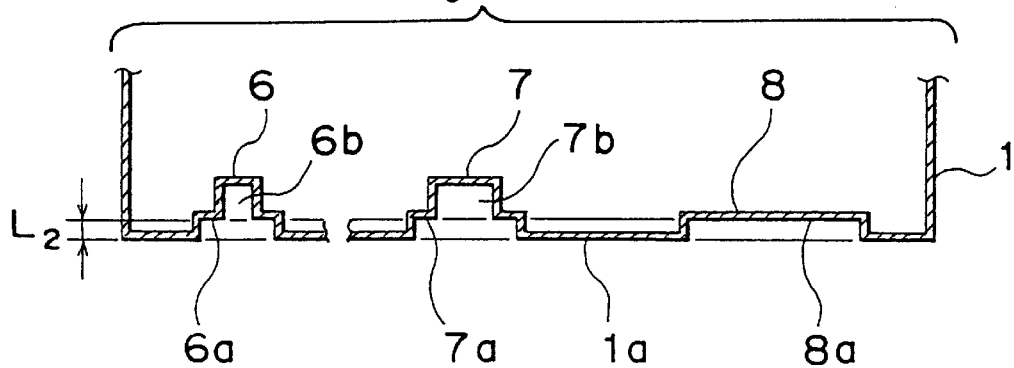

TAPE CASSETTE

This application is a continuation of application Ser. No. 08/897,445, filed on Jul. 18, 1997, U.S. Pat. No. 5,927,632 which is a divisional of application Ser. No. 08/607,524, filed on Feb. 27, 1996, U.S. Pat. No. 5,702,062, which is a continuation application under 37 C.F.R. § 1.62 of prior application Ser. No. 08/359,849 filed on Dec. 20, 1994, now abandoned, which is a continuation application under 37 C.F.R. § 1.62 of prior application Ser. No. 08/106,999, filed on Aug. 17, 1993, now abandoned, the entire contents of which are hereby incorporated by reference.

BACKGROUND OF THE INVENTION

1. Field of the Invention

The present invention relates to a tape cassette, and more particularly, to a shape of its positioning part suitable for, improvement of positioning accuracy in loading the tape cassette to a magnetic recording/reproducing apparatus.

2. Related Art

The tape cassette with built-in reels for winding a magnetic tape, when loaded to an apparatus which performs recording and reproduction, is positioned in a way that the reels and the tape cassette casing are positioned independently of each other. That is, the reels are positioned by a reel base of the apparatus, and the tape cassette casing is positioned by a positioning member of the apparatus.

In conventional tape cassettes, the plane or hole by which a tape cassette casing is positioned is generally provided to the outermost side face, i.e. the lowest face of the casing, for example as in D1 or D2 tape cassette described in "*SMPTE Journal*," March 1986, pp. 358–374. Such a configuration is simplest in construction. Also, such a configuration allows the reference plane or hole to be provided without being much affected by the internal construction, thus suitable for offering thinner tape cassettes.

However, in the above described prior art, accuracy of the reference plane of the tape cassette, especially retention of the accuracy has not been taken into consideration. More specifically, the tape cassette is normally loaded on the apparatus by a cassette loading mechanism. When this is done, the casing surface of the tape cassette is put into sliding contact with the cassette loading mechanism. Repeating such action makes the cassette surface vulnerable to damage. Further, the casing surface is likely to make contact with any foreign matter in transport of the tape cassette or other handling, which could easily lead to deterioration surface accuracy. If surface accuracy of the reference plane of the tape cassette is deteriorates, the tape cassette, when loaded on the apparatus, will result in an incorrect positioning of the tape cassette relative to the apparatus, in which case the tape cassette can no longer be loaded horizontally. As a result, the reels may come into rubbing contact with the casing at the inside of the tape cassette, or the accuracy of the tape guide inside the tape cassette may be negatively effected, resulting in an unstable tape running.

Meanwhile, in recent years, VTRs have been widely used as mini-movies, and increasingly used outdoors. Under such use environments, there is a demand for heavy duty type tape cassettes that will not be damaged even if dropped, besides the need for dust-proof and drip-proof features. Considering such demands from the market, the aforementioned prior art has not been able to provide sufficient adjustments.

SUMMARY OF THE INVENTION

Accordingly, the object of the present invention is to provide a tape cassette which can solve these and other problems and which allows the plane for positioning the cassette to be maintained at high accuracy and ensure the strength of the casing.

The present invention is characterized in that the reference plane for positioning in the axial direction of the tape cassette is provided in a plane a specified amount apart from the outermost surface of the casing.

On the bottom face of the tape cassette, there is partly provided a first recess apart from the bottom face by a specified amount. The first recess is in turn provided with a second recess within a plane. A positioning member by which the tape cassette is positioned in the axial direction when loaded in the apparatus is formed so as to be smaller than the first recess, where axial positioning is done by the inner bottom plane of the first recess. Also, a positioning member by which in-plane positioning of the tape cassette is done is to be fitted to the second recess provided within the first recess. This allows the tape cassette positioning to be accomplished not by the outermost surface of the casing but by an internal plane a specified amount apart therefrom.

BRIEF DESCRIPTION OF THE DRAWINGS

FIG. 1 is a bottom view of a tape cassette according to the present invention;

FIG. 2 is a sectional side view showing the recesses of the tape cassette; along the section line II—II of FIG. 1.

DETAILED DISCUSSION

Figure 3:
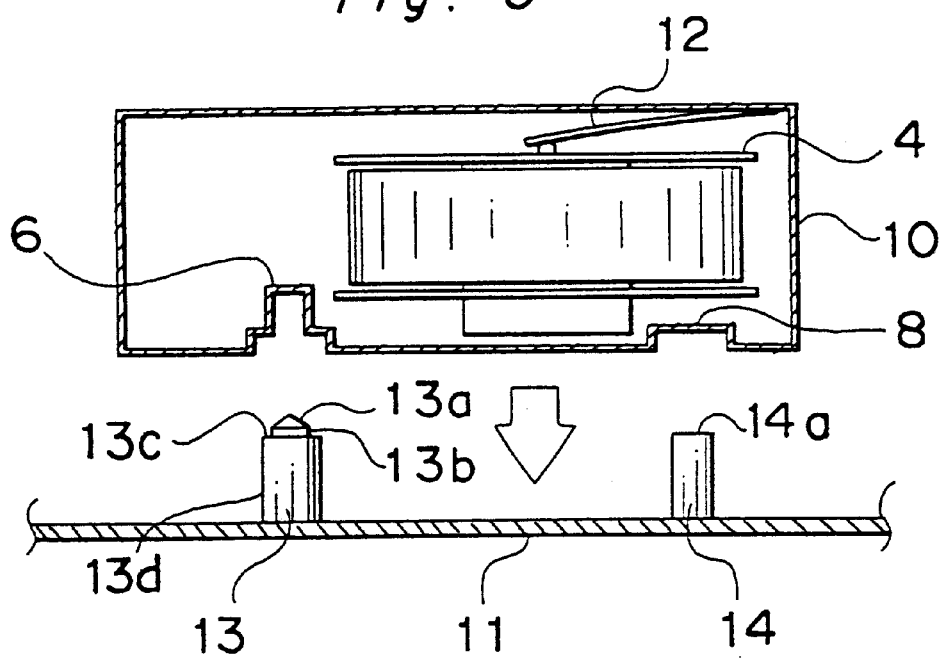
FIG. 3 is a side view showing a state before the tape cassette is loaded.

Embodiments of the present invention are now described in detail with reference to FIGS. 1 through 11. FIG. 1 is a bottom view of one embodiment of the tape cassette according to the present invention. There is seen a tape cassette, 10 including a lower casing; 1, a cover 2 for covering the front face of the tape cassette 10 and 3, an opening 3 formed by the lower casing 1 and the cover 2, into which opening 3 a tape guide is inserted for removing the tape in the loading state. A supply side reel 4 and take-up side reel 5 are provided, both for winding the tape within the tape cassette 10, where a drive unit in the form of a reel base faces outside through the opening provided to the lower casing 1. The lower casing 1 is also provided with reference holes 6 and 7 in proximity to the opening 3. Further, recesses 8 and 9 are provided at corners opposite to the opening 3 with the reels 4 and 5 interposed therebetween. In the present embodiment, these reference holes 6, 7 and recesses 8, 9 are located at such positions as not to overlap with the hub diameter of the reels, thus not providing an obstacle to thinning the tape cassette.

FIG. 2 is a sectional side view showing sections of the aforementioned reference holes and recesses. On a bottom face 1a of the lower casing 1, there are provided various recesses, sections of which are shown in a row in FIG. 2. The reference hole 6 is comprised of two-stage recesses, where a height positioning reference plane 6a (thereby defining an indentation) is provided in the recess that comes first from the bottom face 1a, and a recess (or depression) 6b is provided deeper thereof. The recess 6b is formed into an approximately circular shape. Similarly, the reference hole 7 is also comprised of two-stage recesses, where a height positioning reference plane 7a is provided in the recess that comes first from the bottom face 1a, and a recess 7b is provided deeper thereof. The recess 7b is formed into an approximately elliptic shape. The recess 8 is comprised of a one-stage recess having a height positioning reference plane 8a. The recess 9 is also of a similar shape. The aforementioned height positioning reference planes 6a, 7a, and 8a are preferably provided in equal height ($L_2$). This allows the height reference planes to be flush with one another, making it easier to ensure the accuracy.

Figure 4:
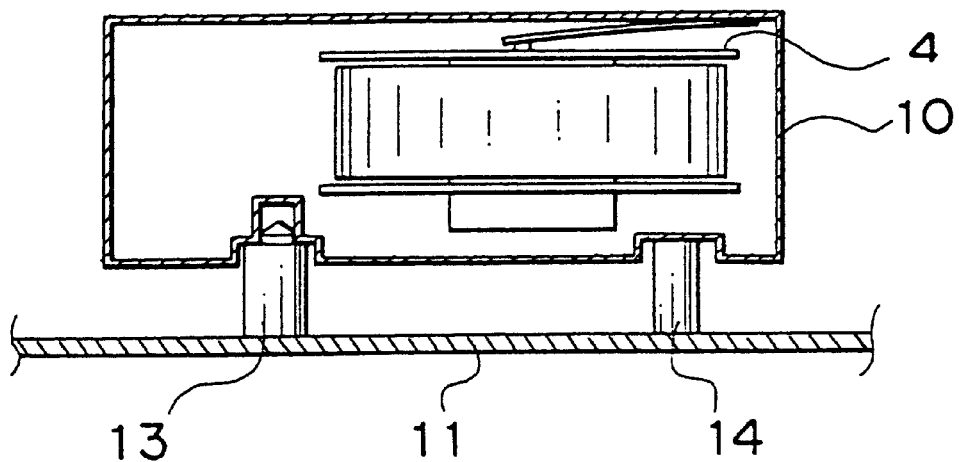
FIG. 4 is a side view showing a state in which the tape cassette is loaded.

Next illustrated is the state in which the tape cassette 10 is loaded to an apparatus. FIG. 3 shows a state before loading, and FIG. 4 shows another after loading. The supply side reel 4 within the tape cassette 10 is restricted in movement in the axial direction by a hold-down spring 12. A chassis 11 has a positioning pin 13 and a height positioning pin 14 fixed thereon. The positioning pin 13, which is of a stepped shape, has at its upper part an approximately conical guide portion 13a and a cylindrical positioning portion 13b downward adjoining thereto, and at its lower part a cylindrical portion 13d provided with a cassette rest-on surface 13c on its top face. At the top end of the height positioning pin 14, a cassette rest-on surface 14a is provided. When the tape cassette moves in the direction as indicated by the arrow in FIG. 3, there will occur a loading state as shown in FIG. 4. The guide portion (or upper part) 13a of the pin 13 determines an approximate position of the tape cassette relative to the chassis by fitting the recess 6b of the reference hole 6, and then the tape cassette is precisely positioned by the mating of the positioning portion 13b and the recess 6b. Also, the cassette rest-on surface 13c of the pin 13 contacts the height positioning reference plane 6a of the reference hole 6, thereby determining the height of the tape cassette. Another similar positioning pin, although not shown, is in correspondence to the reference hole 7, and in cooperation with the reference hole 6, determines the in-plane position of the tape cassette relative to the chassis. The cassette rest-on surface 14a is contacted with the height positioning reference plane 8a, and in cooperation with the cassette rest-on surface 13c, determines the height of the tape cassette. Further, the recesses 8 and 9 as shown in this embodiment, for which a specified area can be ensured, may also lend themselves, for example, to use for an autochanger grip or the like.

Figure 5:
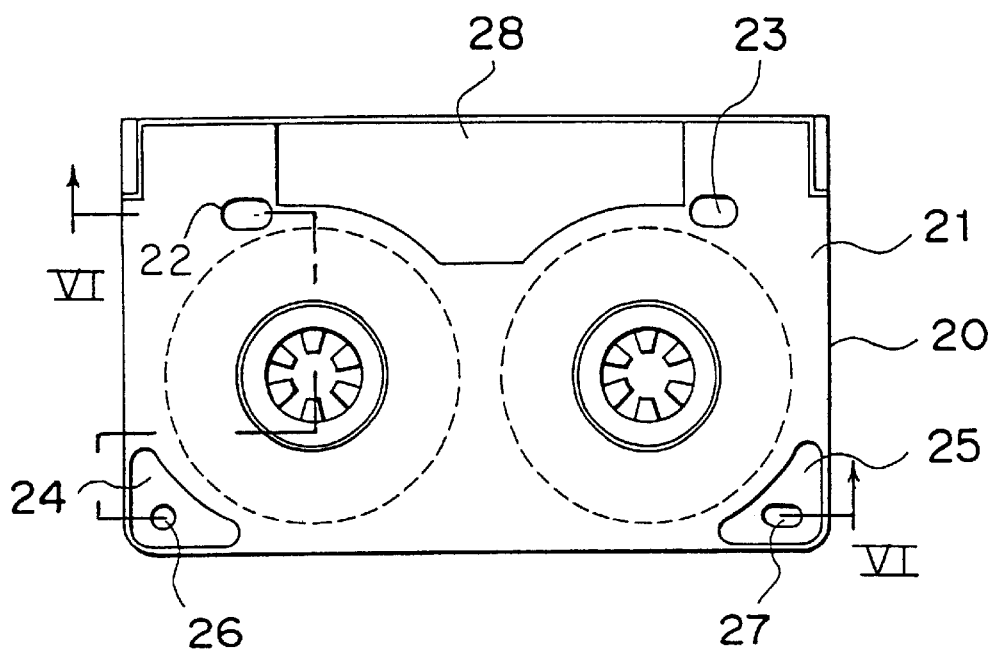
FIG. 5 is a bottom view of a tape cassette according to another embodiment of the present invention.
Figure 6:
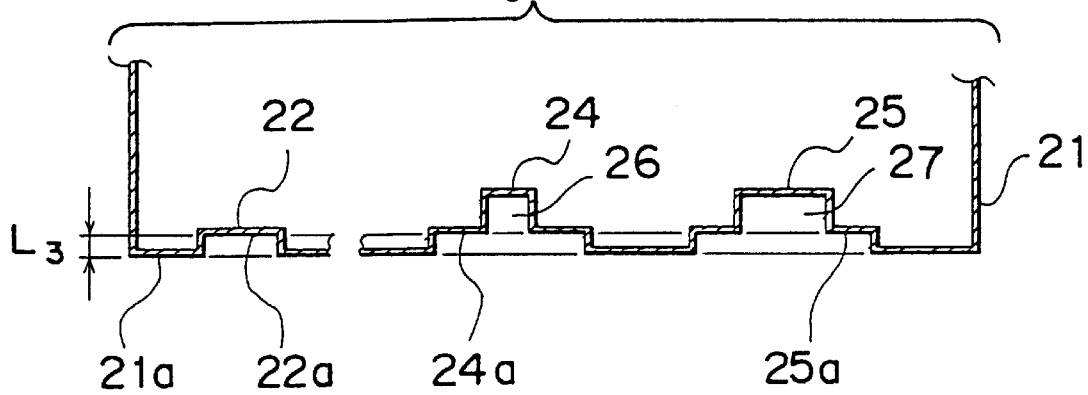
FIG. 6 is a sectional side view showing the recesses of the tape cassette; along the section line VI—VI of FIG. 5.

Another embodiment of the invention is now described with reference to FIGS. 5 and 6. FIG. 5 is a bottom view of a tape cassette, and FIG. 6 is a sectional side view thereof. A lower casing 21 of the tape cassette 20 is provided with recesses 22 and 23 in proximity to its opening 28. The lower casing also has recesses 24 and 25 provided downward at both corners thereof. Further, the recess 24 has a reference hole 26 provided therein, and the recess 25 has a reference hole 27 provided therein. The reference hole 26 is formed into an approximately circular shape and the reference hole 27 is into an approximately elliptic shape. The reference holes 26 and 27 are to have the aforementioned positioning pin 13 as shown in FIG. 3 inserted thereinto, and the recesses 22 and 23 are to have the height positioning pin 14 engaged therein. Height positioning reference planes 22a, 24a, and 25a provided in the recesses are arranged to be equal in height ($L_3$) to a bottom face 21a of the lower casing 21.

Figure 7:
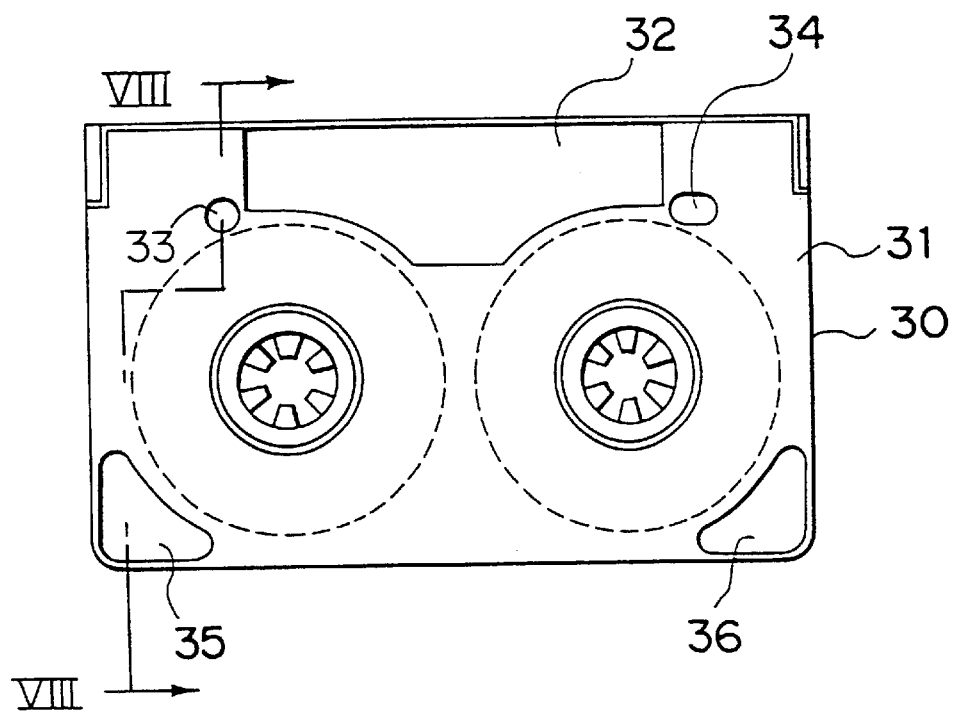
FIG. 7 is a bottom view of a tape cassette according to still another embodiment of the present invention.
Figure 8:
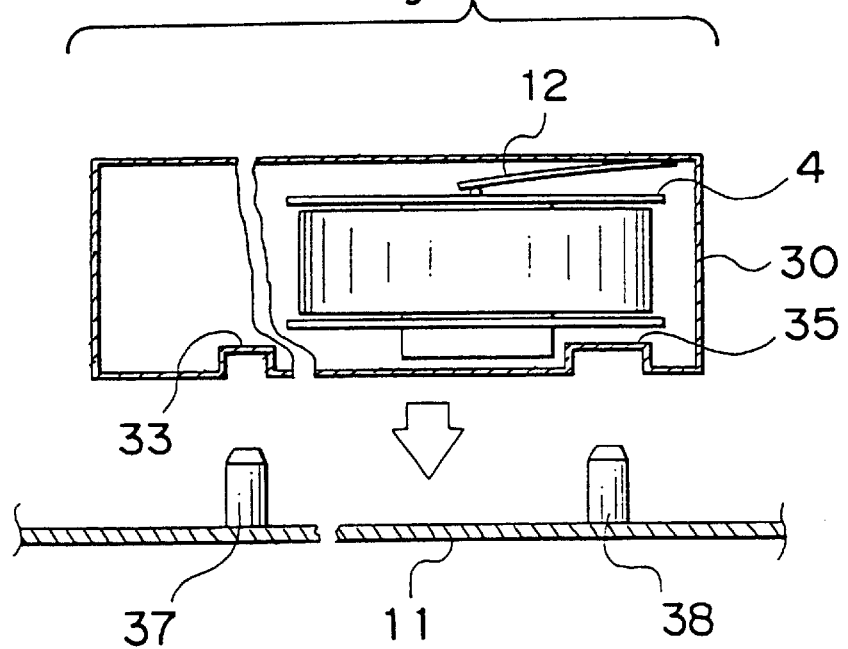
FIG. 8 is a side view showing a state before the tape cassette, is loaded; along the section line VIII—VIII of FIG. 7.
Figure 9:
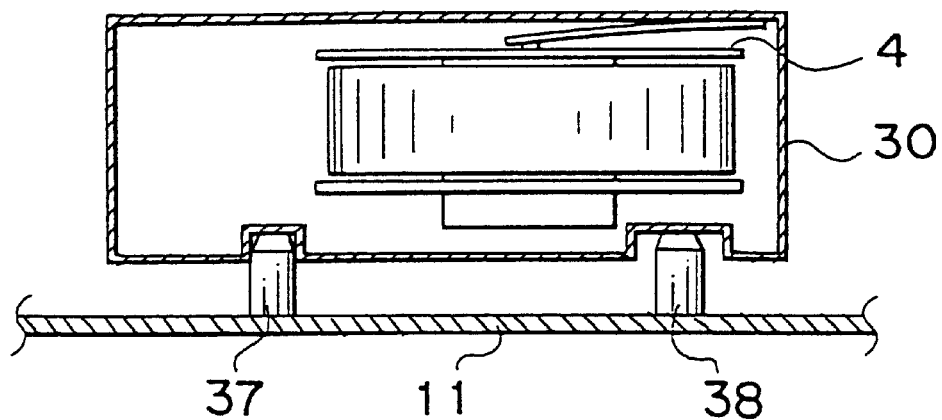
FIG. 9 is a side view showing a state in which the tape cassette is loaded.

Next, still another embodiment of the invention is described with reference to FIGS. 7 to 9. FIG. 7 is a bottom view of a tape cassette, FIG. 8 is a side view of a state before loading, and FIG. 9 is a side view of a state after loading. A lower casing 31 of a tape cassette 30 is provided with recesses 33, 34, 35, and 36. The recesses 33 and 34 are located in proximity to an opening 32 and the recesses 35 and 36 are at corners opposite to the opening with reels interposed therebetween. The recess 33 is formed into an approximately circular shape, and the recess 34 is into an approximately elliptical shape. Also, the recesses 35 and 36 have a specified size. As shown in FIG. 8, the chassis 11 has a positioning pin 37 and a height positioning pin 38 fixed thereon. These pins are of the same shape, having a little taper at the end, thus allowing the same parts to be used therefor. When the tape cassette in the state as shown in FIG. 8 is loaded to the apparatus into the state as shown in FIG. 9, the positioning pin 37 is inserted into the recesses 33 and 34. The inner diameter of the recess 33 and the width of the recess 34 are approximately equal to the outer diameter of the positioning pin 37, so that the tape cassette 30 is determined in position. Further, the height positioning pin 38 is engaged in the recesses 35 and 36. According to the present embodiment, positioning pins can be shared in common use, and the tape cassette can be simplified in configuration.

Figure 10:
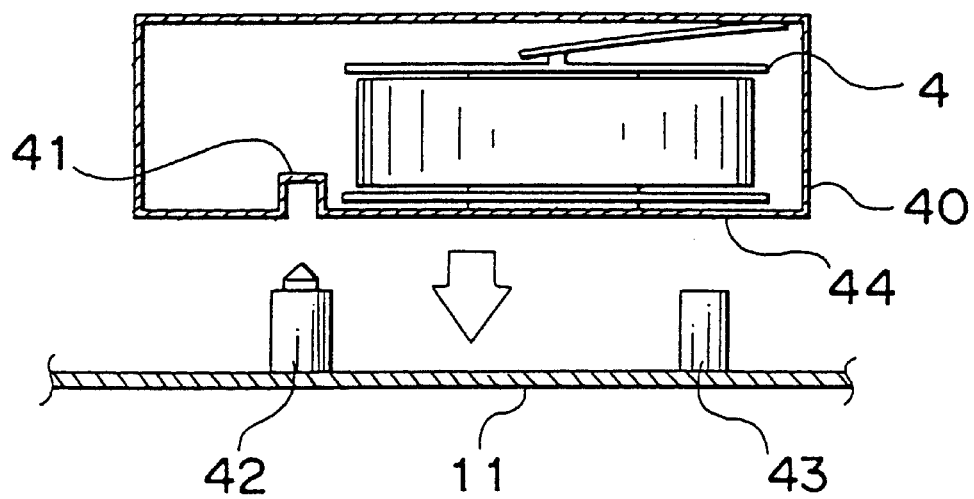
FIG. 10 is a side view showing a state before a conventional cassette is loaded.
Figure 11:
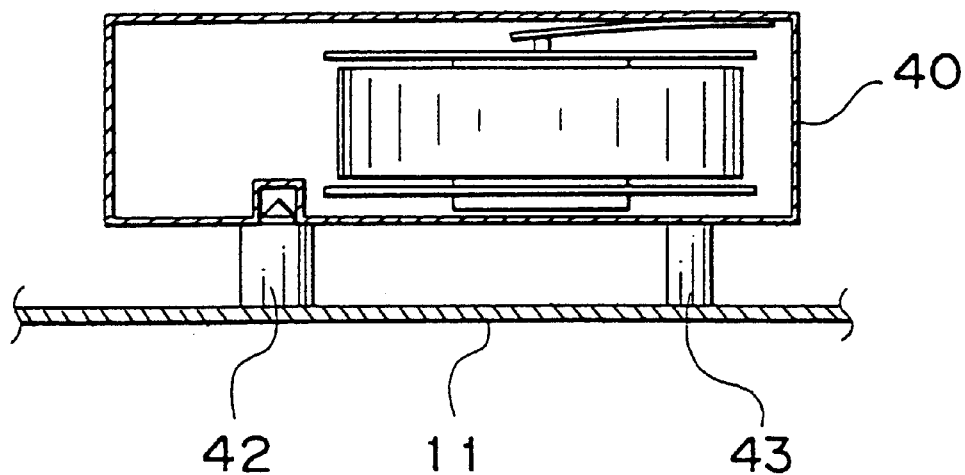
FIG. 11 is a side view showing a state in which the conventional cassette is loaded.

Next described is application of the embodiments of the invention. FIGS. 10 and 11 show an ordinary tape cassette of a thinner type than that described in the present invention. FIG. 10 illustrates a state before the tape cassette is mounted onto the chassis, while FIG. 11 illustrates a state in which the tape cassette has been mounted onto the chassis. A tape cassette 40 with a built-in supply side reel 4 has a reference hole 41 at its bottom face 44. The chassis 11 is provided with a positioning pin 42 and a height positioning pin 43. The positioning pin 42 is to be fitted to the reference hole 41, thereby determining the position of the tape cassette. The height positioning pin 43 is to support a specified position of the tape cassette, thereby determining the height of the tape cassette. In this case, the reference plane for height of the tape cassette is the bottom face 44. In contrast to this, as shown in FIG. 2 and other Figs. illustrating the embodiments of the invention, with a tape cassette 10 thicker than the tape cassette 40, if the distance $L_2$ between the bottom face 1a and the height positioning reference planes 6a, 7a, and 8a is equal to the difference in thickness between the aforementioned tape cassettes, then the height of the tape cassettes can be made equal to each other relative to the chassis while the positioning pins 13 and 42 and the height positioning pins 14 and 43 are of the same shape. That is, it is possible to cope with a tape cassette of the same mechanism and a different thickness. Therefore, a rib or the like for ensuring strength may be provided inside a thick tape cassette.

According to the present invention, since the height positioning reference planes of the tape cassette will never be exposed through the bottom face of the tape cassette, the reference planes can remain free from damage by some mechanism or foreign matter in handling of the tape cassette, ensuring accuracy of the height positioning reference planes.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A first tape cassette adapted to be interchangeably used with a second tape cassette of a different case thickness, wherein said first tape cassette includes a first case having a first total thickness, said first case having a bottom face which is formed with an indentation and a first reference depression formed within the indentation for positioning in a plane parallel to the bottom face thereof, and wherein said second tape cassette includes a second case having a second total thickness which is smaller than the first total thickness of the first case, said second case having a bottom face which is formed with a second reference depression formed within the bottom face thereof for positioning in a plane parallel to the bottom face thereof.

2. The first tape cassette according to claim 1, wherein the first tape cassette and the second tape cassette are commonly positioned by a positioning element of a tape drive apparatus when in a loading state.

3. The first tape cassette according to claim 1, wherein said first tape cassette includes a first tape reel for winding a first tape having a first width accommodated in the first case, and said second tape cassette includes a second tape reel for winding a second tape having a second width accommodated in the second case.

4. The first tape cassette according to claim 1, wherein each of said first and second tape cassettes has an opening for inserting a tape guide to pull out the tape.

5. A second tape cassette adapted to be interchangeably used with a first tape cassette of a different case thickness, wherein said second tape cassette includes a second case having a second total thickness, said second case having a bottom face which is formed with a second reference depression formed within the bottom face thereof for positioning in a plane parallel to the bottom face thereof, and wherein said first tape cassette includes a first case having a first total thickness which is larger than the second total thickness of the second case, said first case having a bottom face which is formed with an indentation and a first reference depression formed within the indentation for positioning thereof in a plane parallel to the bottom face thereof.

6. The second tape cassette according to claim 5, wherein the first tape cassette and the second tape cassette are commonly positioned by a positioning element of a tape drive apparatus when in a loading state.

7. The second tape cassette according to claim 5, wherein said first tape cassette includes a first tape reel for winding a first tape having a first width accommodated in the first case, and said second tape cassette includes a second tape reel for winding a second tape having a second width accommodated in the second case.

8. The second tape cassette according to claim 5, wherein each of said first and second tape cassettes has an opening for inserting a tape guide to pull out the tape.

9. A tape cassette system using interchangeably a first tape cassette and a second tape cassette of a different case thickness, wherein said first tape cassette includes a first case having a first total thickness, said first case having a bottom face which is formed with an indentation and a first reference depression formed within the indentation for positioning in a plane parallel to the bottom face thereof, and wherein said second tape cassette includes a second case having a second total thickness which is smaller than the first total thickness of the first case, said second case having a bottom face which is formed with a second reference depression formed within the bottom face thereof for positioning in a plane parallel to the bottom face thereof.

10. The tape cassette system according to claim 9, wherein the first tape cassette and the second tape cassette are commonly positioned by a positioning element of a tape drive apparatus when in a loading state.

11. The tape cassette system according to claim 9, wherein said first tape cassette includes a first tape reel for winding a first tape having a first width accommodated in the first case, and said second tape cassette includes a second tape reel for winding a second tape having a second width accommodated in the second case.

12. The tape cassette system according to claim 9, wherein each of said first and second tape cassettes has an opening for inserting a tape guide to pull out the tape.

13. A recording/reproducing apparatus using interchangeably a first tape cassette and a second tape cassette of a different case thickness, wherein said first tape cassette includes a first case having a first total thickness, said first case having a bottom face which is formed with an indentation and a first reference depression formed within the indentation for positioning in a plane parallel to the bottom face thereof, and, wherein said second tape cassette includes a second case having a second total thickness which is smaller than the first total thickness of the first case, said second case having a bottom face which is formed with a second reference depression opened towards the bottom face thereof for positioning in plane parallel to the bottom face thereof, said apparatus comprising:

a positioning element for commonly positioning the first and second tape cassettes, said positioning element including a cylindrical member having an upper part formed on the cylindrical member, said upper part having an outer size smaller than that of the cylindrical member, for positioning each of the tape cassettes in a plane parallel to the bottom face of each of the tape cassettes, wherein when the first tape cassette is loaded on the recording/reproducing apparatus, the cylindrical member is inserted in the indentation and the upper part of the cylindrical member is engaged with the first reference depression, and wherein when the second cassette is loaded on the recording/reproducing apparatus, the upper part of the cylindrical member is engaged with the second reference depression.

14. A recording/reproducing apparatus in which a first tape cassette is loaded, the first tape cassette being interchangeable with a second tape cassette of a different case thickness, wherein said first tape cassette includes a first case having a first total thickness, said first case having a bottom face which is formed with an indentation and a first reference depression formed within the indentation for positioning in a plane parallel to the bottom thereof, and wherein said second tape cassette includes a second case having a second total thickness which is smaller that the first total thickness of the first case, said second case having a bottom face which is formed with a second reference depression opened towards the bottom face thereof for positioning in a plane parallel to the bottom face thereof, said apparatus comprising:
a positioning element for commonly positioning the first and second tape cassettes, said positioning element including a cylindrical member having an upper part formed on the cylindrical member, said upper part having an outer size smaller than that of the cylindrical member, for positioning each of the tape cassettes in a plane parallel to a bottom face of each of the tape cassettes, said upper part of the cylindrical member having a configuration commonly engageable with the first and second reference depressions, wherein when the first tape cassette is loaded on the recording/reproducing apparatus, the cylindrical member is engaged with the first reference depression to thereby fix the position in a plane parallel to the bottom face of the first case.

15. A recording/reproducing apparatus in which a second tape cassette is loaded, the second tape cassette being interchangeable with a first tape cassette of a different case thickness, wherein said second tape cassette includes a second case having a second total thickness, said second case having a bottom face which is formed with a second reference depression formed within the bottom face thereof for positioning in a plane parallel to the bottom face thereof, and wherein said first tape cassette includes a first case having a first total thickness which is larger than the second total thickness of the second case, said first case having a bottom face which is formed with an indentation and a first reference depression formed within the indentation for positioning in a plane parallel to the bottom face thereof, and said apparatus comprising:
a positioning element for commonly positioning the first and second tape cassettes, said positioning element including a cylindrical member having an upper part formed on the cylindrical member, said upper part having an outer size smaller than that of the cylindrical member, for positioning each of the tape cassettes in a plane parallel to the bottom face of each of the tape cassettes, said upper part of the cylindrical member having a configuration commonly engageable with the first and second reference depressions, wherein when the second tape cassette is loaded on the recording/reproducing apparatus, the cylindrical member is located below the bottom face of the second case and the upper part of the cylindrical member is engaged with the second reference depression to thereby fix the position in a plane parallel to the bottom face of the second case.

* * * * *